Sept. 29, 1931. S. G. WINGQUIST 1,825,435
HYDRAULIC POWER TRANSMISSION
Filed April 19, 1926 4 Sheets-Sheet 1
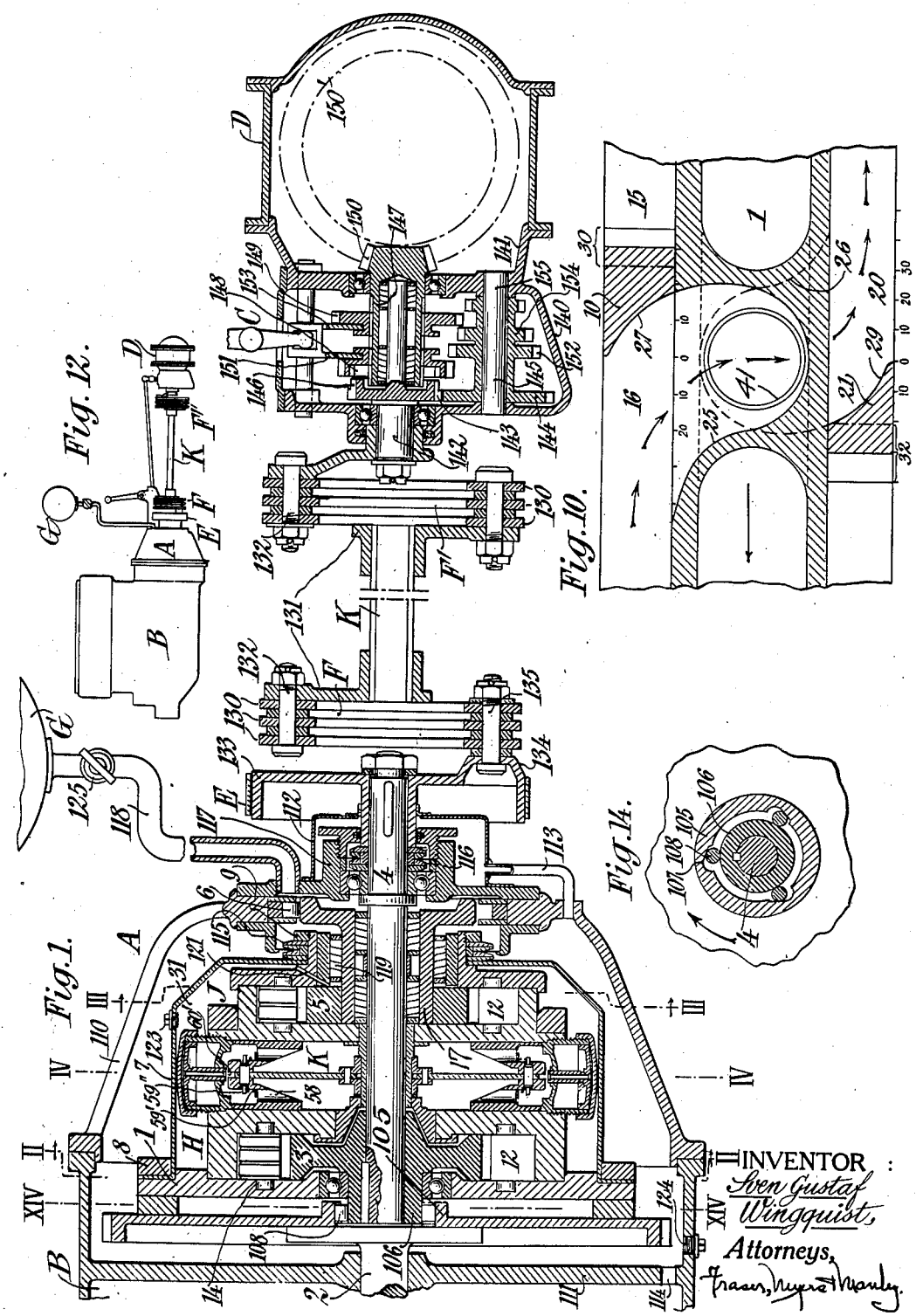
INVENTOR
Sven Gustaf
Wingquist,
Attorneys,

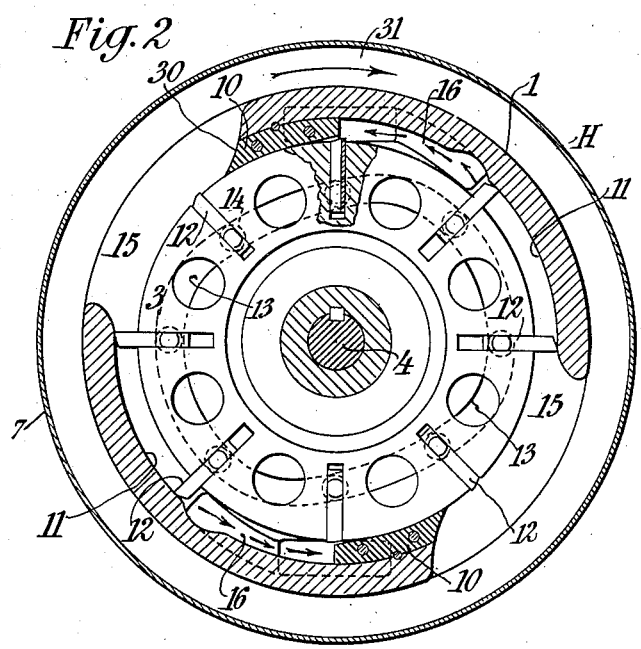
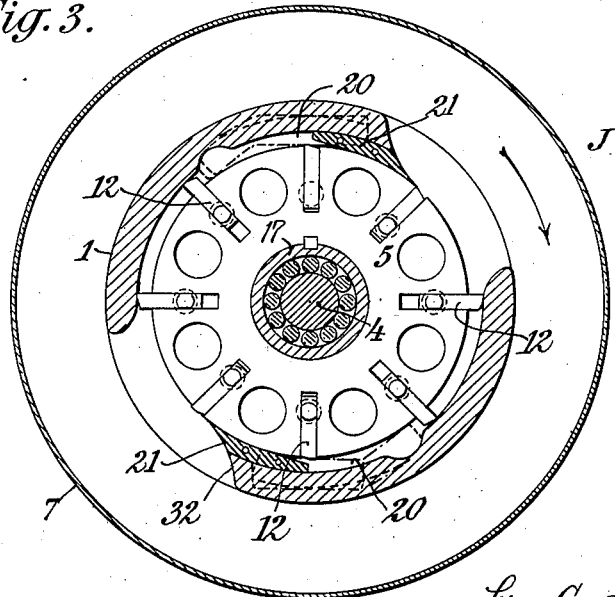

Sept. 29, 1931.  S. G. WINGQUIST  1,825,435
HYDRAULIC POWER TRANSMISSION
Filed April 19, 1926   4 Sheets-Sheet 3
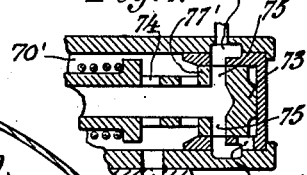
Fig. 7.
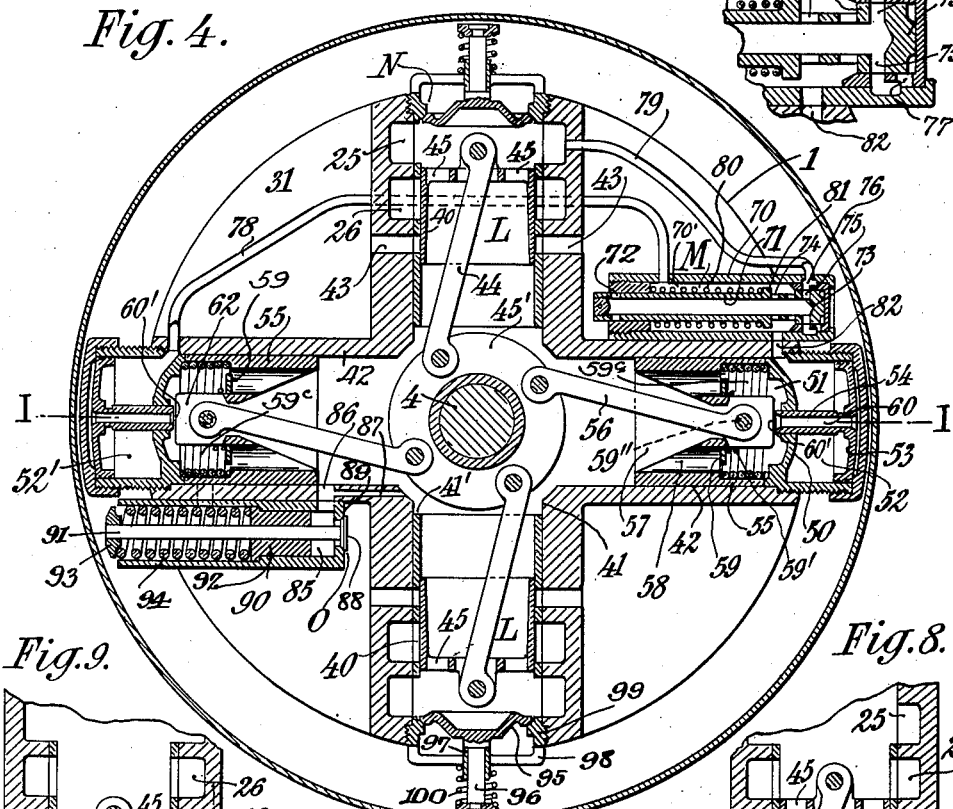
Fig. 4.
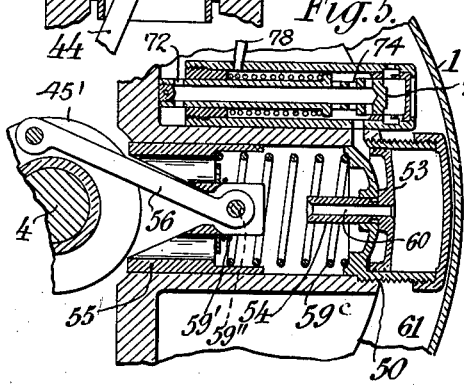
Fig. 9.
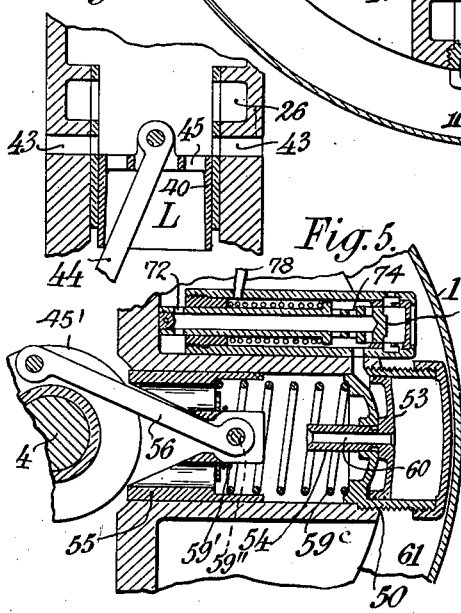
Fig. 5.
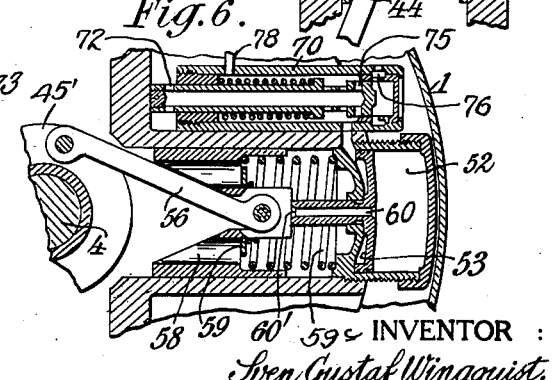
Fig. 8.
Fig. 6.
INVENTOR:
Sven Gustaf Wingquist
By Attorneys,
Fraser, Myers & Manley

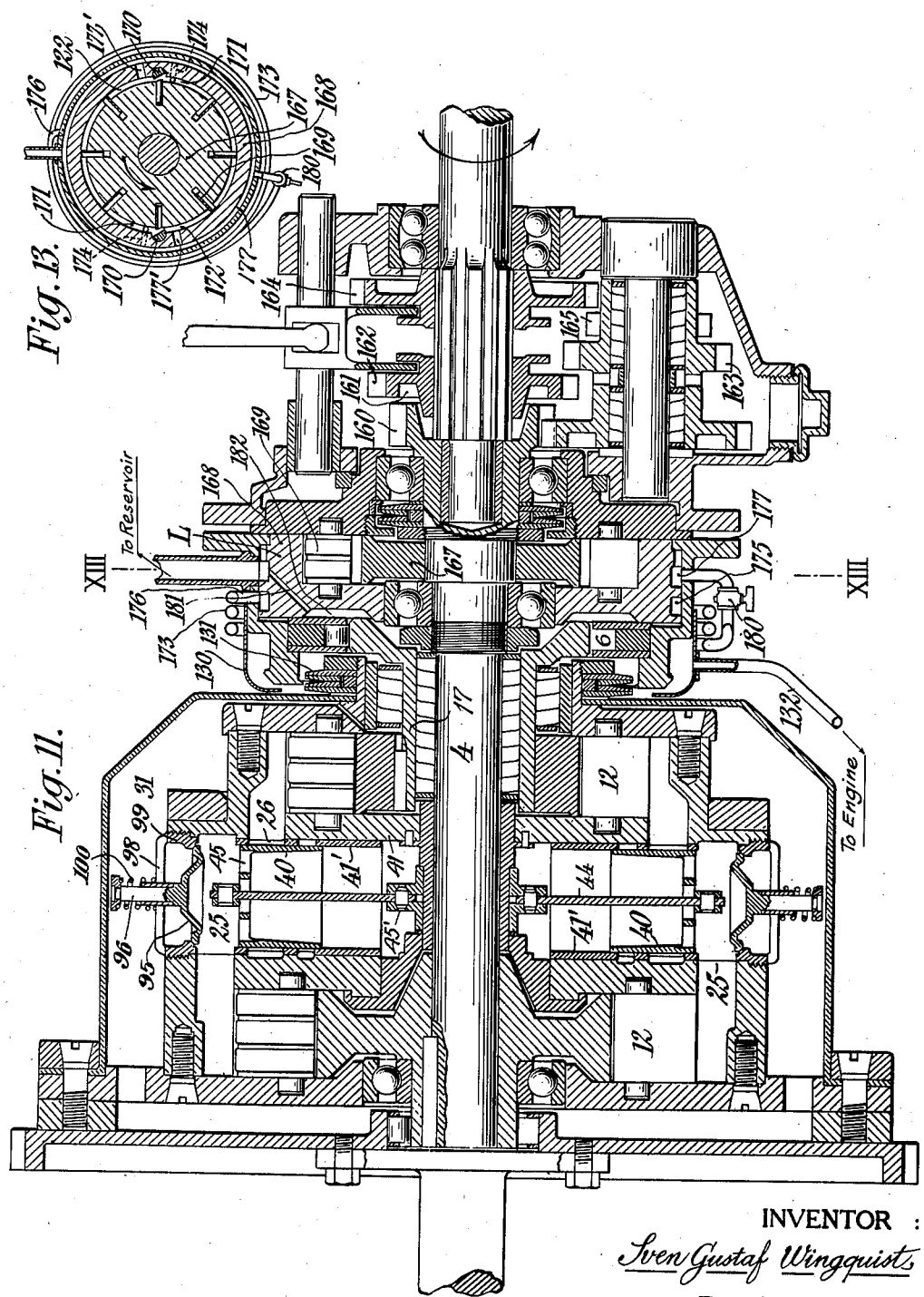

Patented Sept. 29, 1931

1,825,435

UNITED STATES PATENT OFFICE

SVEN GUSTAF WINGQUIST, OF GOTTENBORG, SWEDEN

HYDRAULIC POWER TRANSMISSION

Application filed April 19, 1926. Serial No. 103,036.

This invention relates to hydraulic power transmissions particularly adapted for use in automotive vehicles but applicable to practically any type of equipment in which a variable speed drive is required. This invention relates to the same general type of transmission disclosed in my co-pending United States application Serial No. 575,673, filed July 17, 1922, and application No. 85,291, filed February 1, 1926.

The object of the present invention is to provide certain improvements in hydraulic transmission devices whereby the mechanical efficiency of such apparatus is increased and the construction rendered more simple and compact.

The invention further aims to provide improved automatic control of the transmission ratio of such devices.

A further object of the invention is to provide for the automatic mechanical coupling of driving and driven shafts when the driven shaft tends to rotate faster than the driving shaft.

The invention further contemplates an improved oil supply system whereby leakage from the hydraulic transmission supplies the oil for the prime mover with which the transmission is associated.

The invention also provides an improved combination of mechanical and hydraulic transmission mechanism particularly adapted to automobile drives.

Further objects of the invention will hereinafter be set forth in connection with the detailed description of the accompanying drawings, in which Figure 1 shows a vertical axial section through the combination hydraulic and mechanical transmission applied to an automobile drive.

Fig. 2 is a transverse cross-section along the line II—II of Figure 1, and shows the construction of the delivery pump.

Fig. 3 is a transverse cross-section along the line III—III of Figure 1, and shows the construction of the receiving pump or motor.

Fig. 4 is a transverse cross-section taken along the line IV—IV of Figure 1, and shows the arrangement of the main valves between the pumps and the automatic devices controlling such valves.

Fig. 5 is an enlarged transverse section of the pilot valve and main valve control mechanism.

Fig. 6 is a transverse section of the pilot valve and main valve control mechanism similar to Fig. 5, the parts being shown in different working position.

Fig. 7 is a somewhat enlarged fragmentary view of the pilot valve similar to the view shown in Fig. 5.

Fig. 8 is a fragmentary transverse section through the center of the main valve chambers shown in Fig. 4, the valve occupying a position corresponding to an intermediate speed.

Fig. 9 is a view similar to Fig. 8 but shows the main valve in the position corresponding to free engine.

Fig. 10 is a development of the working spaces of the delivery and receiving pumps and the pressure conduit connecting said pumps.

Fig. 11 is a vertical axial section of a modified form of the combination hydraulic and mechanical transmission device.

Fig. 12 is a longitudinal elevation diagrammatically indicating the relationship of the various parts of the transmission mechanism.

Fig. 13 is a transverse section along line XIII—XIII of Fig. 11.

Fig. 14 is a transverse section along the line XIV—XIV of Figure 1, showing details of the ratchet connection between the driving and driven shafts.

The inventor has found that while it is entirely feasible to construct a hydraulic transmission having any desired number of transmission ratios, it is nevertheless true that beyond a certain point such an arrangement is unnecessarily expensive and complicated, both in point of construction and subsequent operation.

Transmission devices according to the present invention have been constructed having only two transmission ratios, not counting variable speed through a hydraulic slipping clutch effect, which provided the necessary flexibility of control for every operating condition normally encountered by the average motor vehicle. On certain occasions an additional emergency low gear ratio may be required, but these conditions are so rarely encountered as not to warrant the inclusion of additional hydraulic transmission ratios to take care of them. If a vehicle becomes stalled in a ditch or encounters an unusually severe grade when loaded to capacity, a third and perhaps a fourth speed reduction will be required, but such conditions are seldom met with.

To provide for such emergencies a simple gear transmission has been combined with a hydraulic transmission having only two positive speed reductions. The mechanical transmission may incorporate one or two emergency gear reductions and a reverse gear. As is well understood in the art, hydraulic transmissions may be provided with reversing devices whereby reverse drive may be effected hydraulically. Such devices materially complicate the hydraulic transmission, however, and inasmuch as vehicles are required to move backwards only occasionally, and then for comparatively short distances, any possible advantage of the hydraulic reverse is offset by its additional cost and complication. In my co-pending United States application Serial No. 85,291, hereinbefore referred to I have described a mechanical transmission which constitutes an integral part of the hydraulic transmission, Fig. 11 herein showing certain improvements in this type. The preferred embodiment of the present invention is shown in the accompanying Figure 1, the mechanical transmission now being combined with the differential drive of the motor vehicle and therefore removed from the hydraulic transmission which is connected to the engine. The present embodiment has certain advantages both as to structure and operation which will hereinafter be more particularly referred to.

The automatic transmission ratio control mechanism situated between the two pump devices is so associated with specially designed fluid chambers and conduits therebetween as to provide a path of flow for the fluid having a materially decreased resistance and so arranged as to permit of the maximum conservation of kinetic energy in the fluid, with a consequent reduction of heat losses. Apart from the increased mechanical efficiency thereby obtained, there is a material advantage in keeping the temperature of the transmission medium comparatively low, because by so doing its viscosity is maintained more constant, thereby rendering the operation of the device more certain and uniform.

The transmission is so designed that the ordinary lubricating oil employed in the crank case of the usual internal combustion engine is suitable for use as the fluid transmission medium, and a reserve supply of such fluid is maintained in a reservoir which preferably delivers oil directly to the hydraulic transmission and thence to the crank case of the engine. A small continuous flow of oil is thus not only permissible but extremely desirable from the reservoir through the transmission and then to the engine. This permits of a replenishment of the oil both in the transmission and in the engine from a single oil reserve and insures a gradual changing of the oil in the transmission. By this arrangement all difficulty of packing the shafts of the transmission is entirely eliminated, because where heretofore leakage around the shafts presented a real problem, such leakage is now desired; the small flow of oil at such points being conducted to the engine crank case where, as is well understood, a continuous consumption of oil takes place during the operation of the engine. A packing for the shafts which will only permit the quantity of oil required for replenishing the lubricant in the engine is very easily obtained and presents no structural difficulties whatever.

The transmission devices covered by the inventor's applications heretofore referred to, while providing a substantially positive drive from the driving to the normally driven parts, have been of such a nature as to permit a disengagement of the drive when the driven parts tend to rotate faster than the driving parts. According to the present invention, an auxiliary mechanical ratchet coupling is provided whereby a positive mechanical connection will at all times be available when the latter condition exists. Such ratchet connection permits of the use of the braking effect of the internal combustion engine as usually applied to the drive of automobiles, where heretofore this was not possible with the apparatus described. The capacity to utilize the braking effort of the automobile engine is oftentimes desirable. Such braking lessens the wear ordinarily incident to the use of frictional brakes and also provides an additional factor of safety in case of the failure of the friction brakes.

In the following description it will be borne in mind that certain parts of the transmission have been fully described in my co-pending applications referred to above, and consequently such parts will only be here briefly referred to and described in general terms. The portions of the transmission and various combinations which constitute the present invention have been indicated in the foregoing statements relating to the object of the invention and the general statement as to the advance which the invention represents in the art. The transmission is of the hydraulic differential pumping type, that is to say, the rate of exchange of fluid between the delivery and receiving pumps varies in accordance with the difference in speed between the driving and driven shafts. When the two shafts are rotating at the same speed, no pumping action whatever occurs. This represents the condition of direct drive according to usual automotive practice. Since, according to statistics, at least 95% of the running time of the average motor vehicle is spent in direct drive operation, it will be understood that the hydraulic speed reducing device which acts according to the differential principle will only be active and subject to wear during 5% of the running time of such vehicles.

According to the preferred embodiment of the invention, the hydraulic part of the transmission comprises only a single positive speed reduction from direct drive. This speed reduction is further supplemented by a non-positive speed reduction or slip, which, under certain extreme load conditions, occurs between driving and driven shafts. The transmission comprises in its entirety both hydraulic and mechanical speed reductions, the hydraulic portion of the transmission being preferably directly associated with the engine when employed in an automobile, and the mechanical portion of the transmission being formed as a part of the differential housing on the rear axle.

The invention will now be described in detail with reference to the drawings, in each of which similar characters refer to the same or corresponding elements.

Referring first to Figs. 1 and 12; A, represents a stationary housing within which the hydraulic portion of the transmission is situated. This housing is preferably combined with the crank case of an internal combustion engine B to form a unitary structure. The mechanical speed changing part of the transmission is contained within a housing C which forms a unitary structure with the usual differential housing D. Between the hydraulic and the mechanical parts of the transmission is interposed a friction brake E and a propeller shaft having suitable universal joints F, F'. At an elevation above the transmission a fluid reservoir G is mounted and connected to the hydraulic transmission and the engine crank case to provide a common source of fluid, which, in the transmission, is utilized primarily as the transmission medium, and in the engine as the lubricant.

The hydraulic portion of the transmission comprises a driving rotor 1 which is rigidly connected to the power or driving shaft 2, which, in the case of the usual automobile, would be the crank shaft of the engine. Within the driving rotor 1 is situated a driven rotor 3 which is rigidly splined to the driven shaft 4; and also a releasable stator 5, which, by means of a roller ratchet device 6 is prevented from rotating in a direction contrary to that of the driving shaft, in which respect it is a stator, and yet is permitted to freely rotate in the same direction as the driving shaft. For this reason the element 5 is described as a releasable stator. The driven rotor 3 co-operates with the driving rotor 1 to form a rotary vane delivery pump H; and the stator 5, when a reduced hydraulic transmission ratio is required, also co-operates with the driving rotor 1 to form a second pump J, which we will term the receiving pump or motor. The construction and arrangement of the component parts of the delivery pump H and receiving pump J are shown respectively in Figs. 2 and 3. Between the two pump devices referred to is situated a transverse chamber in which the main valves which control the flow of fluid between the delivery and receiving pumps, together with automatic regulating means for such valves are located. The automatic valve control mechanism will be generally indicated by the letter K, the main valves by the letter L, and the pilot valve by the letter M. In addition to the elements referred to, a suction relief valve N and a pressure relief valve O are provided, as indicated in Fig. 4.

The two pumps will now be described in detail. Referring first to the delivery pump H shown in transverse cross-section in Fig. 2, the pump comprises abutments 10 and working surfaces 11 rigidly secured to the housing 1, which constitutes the driving rotor. Co-operating with said abutments and working surfaces, the internal driven rotor 3 provided with radially movable ribbed vanes 12 completes the delivery pump H. The radial position of the vanes 12 is controlled by means of two cam rings 13 in the driving rotor and into which vane rollers 14 project. As indicated in Fig. 2, the vanes occupy their outer radial position during the part of their revolution in which they traverse the working surfaces 11 and are gradually retracted to their innermost radial position in order to escape the abutments 10 in rotating past such abutments. The fluid enters the delivery pump through the two intake chambers 15, 15, is trapped between the vanes 12 and the working surfaces 11, and is then forced out of the pump through the pressure chamber 16. The driving rotor 1 is propelled by the engine in the direction indicated by the arrow. The driven rotor 3 within the driving rotor rotates at substantially the same speed and in the same direction as the driving rotor when the transmission is operating in direct drive. Between this condition and the condition of free engine various degrees of relative motion or slip will occur between the driving and the driven parts, as will hereinafter be more fully set forth. It will be borne in mind that while the driven rotor rotates in the direction of the arrow, whenever it is in motion, its relative motion, due to the fact that it may lag behind the driving rotor, will appear to be in the opposite direction with respect to such rotor, and, as previously described, the fluid will be forced out of the pressure chamber 16 of the delivery pump in the direction of the arrows indicating the fluid flow.

The receiving pump J is a rotary vane pump similar in design to that of the delivery pump H above described. The capacity of the receiving pump is, however, preferably materially smaller than that of the delivery pump. The internal element 5 (see Fig. 3) in which the vanes 12 are mounted, constitutes a releasable stator. Its rotation in a direction contrary to that of the driving rotor 1 is checked by the roller ratchet device 6 which acts on a sleeve 17, upon which the stator 5 is rigidly mounted. The stator is, however, permitted to freely rotate in the direction of the driving rotor as indicated by the arrow, the direction of rotation in both Figs. 2 and 3 being clockwise.

When the hydraulic transmission is in direct drive the receiving pump J is not required to function, and therefore at such times is permitted through the automatic release of the stator ratchet device 6 shown in Fig. 1 to idly rotate with the driving rotor, thereby eliminating any relative motion between the said rotor and the releasable stator element 5. Because, as hereinbefore pointed out, the average transmission operates in direct drive 95% of the time, it is obvious that the wear on the moving parts of the receiving pump will be reduced by 95%, as compared with a pump in which the stationary element is not releasable and in which the maximum relative motion would take place between the driving rotor and the stator during the entire operating time.

In the receiving pump or motor J, fluid is received under pressure from the pressure chambers of the delivery pump H in the pressure or working chambers 20, and acts against the stator vanes 12 in a direction tending to rotate the stator counter-clockwise. The stator being checked against rotation in a counter-clockwise direction, does not, under such conditions, move, but acts merely as a fixed point of application of pressure, the fluid re-acting against the abutments 21 to produce a thrust acting on the driving rotor 1 in a direction favoring its rotation. The receiving pump thus acts as a motor or booster unit when fluid is delivered to it and produces a torque which is added to the normal torque supplied by the prime mover to the driving rotor. For a more complete explanation of the differential pumping principle employed in the present transmission, reference may be had to my copending applications hereinbefore referred to.

According to the present invention, the circuit of the fluid in passing through the delivery pump to the receiving pump and through the receiving pump back to the intake chamber of the first-mentioned pump, has been designed to reduce the power losses to a minimum. Not only is the resistance of the passages greatly reduced, but the direction of application of the fluid to the moving parts of the pumps has been altered so as to conserve as far as possible the kinetic energy stored in the moving fluid, much of which has heretofore been wastefully dissipated. By these means the mechanical efficiency of the transmission has been materially increased, and at the same time the working temperature of the transmission medium has been reduced in the same degree, because the power losses heretofore experienced gave rise to proportionate increases in the temperature of the fluid.

The important step in the elimination of resistance to the flow of fluid through the transmission, according to the present invention, is the provision of a novel form of pump abutment. These abutments, instead of as heretofore being formed as simple transverse baffles across the annular working chambers of the pumps, are now designed to conform to the ideal stream line whereby to deflect and eject the fluid from the delivery pump into the valve controlled passage between the delivery and receiving pumps with a minimum energy loss. The preferred contour of the working face of the delivery pump abutments is shown in Fig. 10. This figure is a development of one-half of the transmission, showing a section of the cylindrical fluid path, unrolled, so to speak, on a flat surface. A delivery pump abutment 10 is shown in section at the upper right part of the figure, and the receiving pump abutment 21 at the lower left. It will be borne in mind that both these abutments are rigidly mounted on the driving rotor 1 which is continuously rotated by the engine in the direction indicated by the large arrow. The circle 41 represents the bore of the radially movable piston valve which controls the flow of fluid between the two pumps. The solid lines 25 indicate the contour of the channel leading from the delivery pump H to the outer part of the valve chamber while the dotted lines 26 show the contour of the channel leading from the inner part of the valve chamber to the receiving pump J. The course of the fluid from the pressure chamber 16 of the delivery pump to the working chamber 20 of the receiving pump or motor is indicated by the line of arrows. It will be observed that the walls of the channel 25 are designed to form a smooth and continuous extension of the curved contour 27 of the abutment 10, and also that the walls of the channel 26 bear the same relationship to the curved contour 29 of the working face of the receiving pump abutment 21.

According to the design indicated, it is clear that a fluid path between the co-operating chambers of the two pumps H and J has been provided which permits of the smoothest possible flow of fluid between such pumps. The curved contour 27 of the abutment 10 produces a gradual acceleration of the fluid in the direction transverse to the movement of fluid in the delivery pump, so that the turbulence which has heretofore characterized the fluid stream upon leaving the delivery pump is entirely done away with. The same thing is true as to the receiving pump abutment, the fluid coming from the valve chamber through channel 26 engaging the leading edge of the curved abutment surface 29 at practically zero incidence and being gradually deflected into the working chamber 20 of the receiving pump. It is to be here particularly observed that the attack of the fluid upon the working surface 29 of the receiving pump abutment is such as to produce a thrust in a direction favorable to the rotation of the driving rotor on which the abutments are mounted. The kinetic energy of the fluid which has heretofore been largely dissipated in the useless development of heat in the transmission medium is, according to the present invention, conserved and permitted to perform useful work in augmenting the torque of the driving rotor.

A similar improvement has been effected in the faces of the abutments opposite to those already described. In the delivery pump abutments the surface now to be described is indicated at 30. This surface, as best shown in Fig. 2, is now formed to provide a curved incline which permits of a smooth flow of fluid from the common idle fluid chamber 31 into the delivery pump. Such idle fluid chamber comprises annular space between the circle of the abutments and working surfaces and the outer wall or housing 1 of the driving rotor. The surfaces 32 of the receiving pump abutments, as shown in Fig. 3, are also formed to provide a scoop-like surface adapted to pick up the transmission fluid as it is exhausted from the receiving pump or motor, and gradually and smoothly accelerate the fluid so that it will be discharged into the annular body of idle fluid rotating with the housing 1 with a rotary velocity substantially the same as that of the fluid with which it there mingles. The fluid immediately upon leaving the working chambers of the receiving pump or motor, J, has an absolute velocity of zero, the vanes 12 being held against rotation in the stator 5, as hereinbefore pointed out. Consequently it is necessary by some means to accelerate the stationary fluid up to the velocity of the fluid in the idle fluid chamber 31. Stating it in another way, the velocity of the fluid as it enters the idle fluid chamber, with respect to the fluid in such chamber, should be zero. Obviously, when this condition obtains, no energy loss will occur upon the mingling of the exhaust fluid from the receiving pump or motor and the idle fluid. The energy required to accelerate the exhaust fluid is not lost but is again returned to the system, due to the fact that the idle fluid as it enters the delivery pump has a relative forward velocity with respect to the vanes thereof which results in a giving up of a considerable part of the energy of its motion to the driven rotor 3 on which the delivery pump vanes are mounted.

Fluid exhausted from the receiving pump J is conveyed to the delivery pump H through an annular idle fluid chamber 31 surrounding the two pumps. According to the preferred embodiment of the invention, this chamber is formed by a comparatively light apron or shield of metal surrounding the driving rotor and which is fastened at either end thereto in a manner insuring fluid-tight connection. This construction results in certain advantages, among which are lightness and reduced manufacturing cost. The construction illustrated in Figs. 1 and 11 permits of the removal of the apron 7 without disassembling the rotor, whereby ready access may be had to the valves and automatic valve control mechanism. With the apron removed, the pump vanes may also be inspected through the openings between the abutments and working surfaces.

The shield or apron 7 may be drawn, stamped or otherwise formed from sheet metal of relatively light gauge and may be fastened against the driving rotor by means of clamping rings 8 and 9. As the rotor proper is possessed of ample structural strength, the apron is not called upon to sustain any strain except those occasioned by the idle fluid pressure due to centrifugal force.

An increase in the number of vanes in pumps of the present type from six vanes to eight, permits the attainment of increased efficiency due to the fact that not only may the abutments be made long to provide the necessary surfaces of special contour for improving the stream path, as above described, but the working surfaces 11 of the pumps, as shown in Figs. 2 and 3, can be made shorter to provide a comparatively large opening between such surfaces and the abutments, whereby fluid will be more freely admitted to the delivery pump H and exhausted from the working chambers of the receiving pump J. As indicated in Fig. 2, the angular opening between the abutments and working surfaces is practically 45°, and at the same time the opening from the pressure chamber 16 of such pump to the channel 25 leading to the central valve chamber occupies 60°. The angular dimensions of the abutments are indicated in degrees in Fig. 10. The scale of angular measurement for the delivery pump H does not correspond with that of the receiving pump J in the figure, for the reason that the receiving pump is of smaller diameter than the delivery pump, and consequently 10° will occupy more space in the former than in the latter.

The valves and automatic control mechanism therefor operate in accordance with the principles set forth in my copending United States applications hereinbefore referred to, but the arrangement of the several parts is modified both as between the valves and their control devices, and between such elements and the transmission pumps. The pumps employed being of the duplex or bi-polar type, two main valves are provided, one for each of the working chambers of the pumps. This arrangement permits of a symmetrical disposition of parts whereby the rotor containing these parts is at all times dynamically balanced, and also permits of a very short channel between the co-operating chambers of the delivery and receiving pumps, as indicated in Fig. 10, thus reducing the fluid resistance to the greatest extent possible in this manner. The primary controlling device for the main valve pistons 40 is also duplicated, the parts being diametrically disposed also for the purpose of obtaining dynamic balance and insuring a more reliable control because of the fact that if, for any reason, one should fail to operate, the other would, at least to a certain extent, still be effective.

The main valve pistons 40 are slidably mounted in a bore 41 extending diametrically through the center section of the main casting which constitutes the frame of the driving rotor, the bore preferably being lined with a hardened sleeve 41'. A second bore 42 of substantially the same diameter, axially intersects the bore 41, and this second bore also extends diametrically through the center section of the driving rotor 1.

As the two main valves in opposite ends of the bore 41, and also the main valve control pistons in opposite ends of the bore 42 are substantially alike, only one of each of these elements will be described.

The radially outward portion of the main valve bore communicates throughout its entire circumference with the channel 25 leading from the delivery pump H. Immediately below such annular port with which channel 25 communicates is a second port separated from the first by a short section of the valve chamber wall, said second port providing communication between the valve bore and the channel 26 leading to the working chamber of the receiving pump J. The shape and relationship of the channels 25 and 26 to the valve bore 41 is best shown in Fig. 10. In this figure, it will be observed that fluid is delivered from channel 25 to the outer chamber of the valve from every side, and the fluid, after passing through the valve bore, is permitted to escape into the channel 26 over the entire circumference of the valve because of the fact that the said channels completely surround the valve. By this construction, fluid resistance in the valve is materially reduced.

When the valve 40 is in the position shown in Figs. 4 and 11, communication is cut off between the channels 25 and 26 and no fluid can flow from the delivery pump to the receiving pump. This valve position corresponds to direct drive, the fluid trapped in the chambers of the delivery pump serving as a substantially rigid connection between the driving and driven elements of the pump.

The valve 40 may assume two other working positions, one of these being shown in Fig. 8, where the valve is moved radially inwards to permit free communication between the chanels 25 and 26. This position corresponds to the intermediate speed of the hydraulic drive, fluid being delivered from the pump H to the receiving pump or motor J and permitting a differential pumping action whereby the driving rotor rotates at a relativel higher speed than the driven rotor, in a manner well understood.

The third position of valve 40 is shown in Fig. 9, in which by-pass ports 43 are opened, thereby venting the valve bore to the idle fluid space within the transmission housing. The extreme inward position of the valve shown represents the condition of free engine. The driving rotor rotates with 100% slip relative to the driven rotor, it being impossible to produce any driving torque between the driving and driven parts because of the fact that the pressure chambers of the delivery pump are now vented through ports 43 so that no appreciable fluid pressure can be developed within the pump. As will be more fully described hereinafter, the valve member 40 may assume any position between that shown in Fig. 9 and a position in which the by-pass ports 43 are completely closed whereby to provide for various degrees of clutching effect, this latter function serving the purpose of the friction clutch now commonly employed in motor vehicles.

It will be observed that the valve member 40 virtually constitutes simply a sliding sleeve and not a piston, because the head to which the valve-actuating connecting rod 44 is pivoted is pierced by a number of bores 45 providing free access of the fluid pressure from the delivery pump and channel 25 to the entire interior of the intersecting bores 41 and 42 not occupied by the valves or control means therefor.

The valve connecting rod 44 is at its inner end pivoted to a freely rotatable disk 45', the angular position of which is at all times determined by the valve-actuating mechanism situated in the bore 42, and which will now be described.

At a point toward the outward end of bore 42 a fixed diaphragm or head 50 divides the interior thereof into two separate chambers. The inner chamber 51 is, as before indicated, at all times in communication with the fluid pressure of the delivery pump, the entire interior of the intersecting bores 41 and 42 having access to such pressure through the ports 45 in the main valve members 40. The radially outward chamber 52 contains the pressure-sensitive piston 53, from which piston is derived the fluid force which acts upon the main valves 40. The piston 53 carries a piston rod 54 which passes through a properly packed bore in the head 50 and bears directly against the cross-head 55, which, in turn, is operatively connected to the valve-actuating disk 45' by means of a connecting rod 56.

The cross-head 55 comprises a cylindrical block of metal having considerable mass. The cross-head slides freely in the bore 42 and is interiorly cut away, as shown, to provide a slot 57 in which the connecting rod 56 may swing in rotating the disk 45'. The cross-head is also bored through from end to end to provide passages 58 through which fluid may flow to relieve the cross-head of undesired pressures which would be developed between it and the stationary diaphragm or head 50 if no path for fluid escape were provided therebetween. Partially closing the passages 58 is a flap valve 59 which is pressed against the face of the cross-head by a spring 59' bearing against pins 59" projecting from the boss 62, in which the end of the connecting rod 56 is pivoted. When the cross-head tends to move radially inward, the valve disk 59 lifts off its seat and permits a practically unrestricted flow of fluid into the space between the cross-head and the diaphragm 50. Movement in the opposite direction will, however, be checked by the partial closure of the passages 58 through the action of the spring-pressed valve disk. By this construction there is provided, in effect, a dash pot which permits a free and rapid movement of the main valve controlling mechanism in a direction tending to reduce the transmission ratio or establish a condition of clutch slip or even free engine, but which, on the other hand, will prevent a transition from free engine to intermediate speed and direct drive, to occur too rapidly. The reason for this is quite obvious, the result of too quickly engaging a clutch, for example, being well understood, whereas it is quite immaterial how quickly a clutch is disengaged, and in emergencies the sudden disengagement of the clutch may be imperative.

To the extent that the cross-head 55 can be moved by the shifting of the fluid-sensitive piston 53 pressing thereagainst through rod 54, the control of the main valve will be effected under the simultaneous influence of fluid pressure, and the opposing effort of centrifugal force acting upon the mass of the cross-head. Beyond the point representing the innermost position of the control piston 53 shown in Fig. 6, the cross-head 55 will move inwardly quite independently of fluid pressure, under the influence of a compression spring 59c, one end of which bears against the cross-head and the other against the stationary head 50. This movement will occur whenever the centrifugal force acting on the cross-head is less than the spring pressure. The extreme inward movement of the cross-head under the influence of the spring 59c is shown in Fig. 5, and the corresponding position of the main valve is shown in Fig. 9, which position, as before pointed out, represents free engine. The main valve will be caused to assume this position whenever the speed of the engine has fallen to a predetermined point below which the pressure of spring 59c is superior to the effect of centrifugal force. By such an arrangement, the accidental stalling of an automobile engine is prevented if the spring be so designed as to effect an opening of the by-pass ports 43 at a speed somewhat above that at which the engine will stall. As soon as the engine reaches this minimum speed it will be automatically relieved from the load by the governing action of the combined mass of the cross-head and parts connected therewith, which are sensitive to centrifugal force, and the governor spring 59c. It will be apparent that the mechanical connection between the valves 40 and the cross-heads 55 are such as to impose also upon the cross-heads the effect of centrifugal force acting upon the valves and connecting rods associated therewith.

The pressure-sensitive control piston 53 determines the position of the main valves through its action on the cross-head 55 at all speeds in excess of the minimum speed above referred to, below which speed spring 59c becomes operative. The radially outward face of the piston 53 is at all times subjected to the fluid pressure obtaining within the pressure chambers of the transmission, a communication being had with such chambers through a bore 60 and port 60' in the piston rod 54. This bore communicates with the interior of the chamber in which the cross-head 55 is situated, it being remembered that the entire space within the bores 41 and 42 is at all times in communication with the pressure chambers of the delivery pump. If the control chamber 52 situated between the diaphragm 50 and the piston 53 be also placed in communication with the pressure chambers of the transmission, it is obvious that the fluid forces acting on the two sides of the piston will be balanced, and consequently a comparatively small rotational speed will produce sufficient centrifugal force to move the piston to its outer radial position shown in Fig. 4 or maintain it in such position. On the other hand, if the control chamber 52 is relieved from fluid pressure and vented to the idle fluid chambers of the transmission, the pressure acting on the outer face of the piston will be fully effective and will move the piston inwards to the position shown in Fig. 6. The area of the control piston is such that when it is subjected to the unbalanced fluid pressure it is capable of moving the cross-head 55, and consequently, the main valve 40 to the position corresponding to direct drive, against the action of centrifugal force acting on the several parts.

Mounted alongside the cylinder in which the main valve control piston above described is located is a pilot valve device M. It is the function of this pilot valve to determine whether the control chamber 52 of the main valve actuating piston 53, shall be subjected to fluid pressure or vented to the idle fluid chambers of the transmission. Since the fluid pressure within the control chamber positively determines whether the main valve shall occupy the position corresponding to direct drive or the position corresponding to the intermediate hydraulic transmission ratio, it is obvious that the position of the pilot valve actually determines the operating condition of the transmission as a whole.

The pilot valve comprises a cylinder 70 within which a hollow plunger 71 is adapted to freely slide. As shown in Fig. 4, the end of the plunger to the left projects through the head of cylinder 70. Toward the end of the plunger a transverse bore 72 provides a free passage for fluid when the plunger is moved to the left sufficiently to uncover the ports provided by such bore. The plunger is shown in the position above referred to in Fig. 6. The space surrounding the pilot valve forms a part of the idle fluid chamber of the transmission so that when the plunger is moved, as shown, to the left, any fluid within the hollow plunger can freely escape. At the right hand end of the plunger 71 a somewhat enlarged valve head 73 is formed, and immediately to the left of such head, ports 74 are bored in the wall of the hollow plunger to provide communication between its interior and the annular space within the cylinder 70 surrounding the plunger. In the valve head 73 ports 75 are formed which provide, in the position of the valve shown in Figs. 4 and 7, communication between the interior of the plunger, and an annular pressure chamber 76 formed in the wall of the cylinder 70. This chamber is at all times directly connected to the pressure channel 25 of the delivery pump through a conduit 79. When the valve occupies the position shown in Fig. 6, the ports 75 no longer register with the pressure channel 76, but instead, the pressure in such channel is admitted to the space to the right of the valve head 73, thus subjecting such head to fluid pressure only on one side. It will be observed that the valve head and plunger are so designed that when the ports 75 give access of fluid pressure to the interior of the plunger and thence through ports 74 to the annular space within the cylinder 70, the vent ports 72 are closed. With the valve in the left hand position the reverse is true, ports 72 being vented to the idle fluid space and ports 75 being moved so as no longer to register with the pressure channel 76.

Through a small duct 77, the valve head 73 is always in communication with the pressure channel 76. When the valve is in the position shown in Fig. 6, no pressure is applied to any other portion of the pilot valve, so that the entire area of the head 73 is fully effective, and such area multiplied by the pressure obtaining within the transmission determines the force tending to move the valve to the left. In the position shown in Figs. 4 and 7, however, the entire space within the cylinder 70 is filled with fluid pressure, and consequently, the pressure acting on the head of the valve producing a thrust toward the left, will be somewhat neutralized by the pressure acting on the annular surface 77' in a contrary direction.

If $x$ represents the area of the piston head 73 and $y$ the area of the annular counterbalancing surface 77', then when the valve is in the position shown in Figs. 4 and 7, the force tending to move the pilot valve to the left will be $p(x-y)$, $p$ representing the fluid pressure set up at any time by the delivery pump, which pressure, as is well understood, is an index of the torque load on the transmission. When the pilot valve is in the position shown in Fig. 6, as before pointed out the counter-balancing area is no longer subjected to pressure, and consequently the force acting on the piston head 73 will be $px$. The fluid force acting upon the pilot valve is at all times balanced by a spring 80 surrounding the hollow plunger 71, one end of the spring bearing against a shoulder 81 on the plunger, the other end bearing against the inner head of cylinder 70. While the driving rotor 1 is rotating there will also be set up a force tending to move the plunger to the right due to centrifugal action, and this force will be determined by the speed of rotation of the rotor.

The pilot valve constructed as above described obviously provides a control device which is simultaneously and in opposite directions sensitive to the influence of centrifugal force, which is a function of the speed of the driving rotor, and fluid pressure which is an index of the load upon the transmission. The action of the pilot valve is rendered more positive through the provision of the variable effective pressure area arrangement whereby, when the valve is in the position shown in Fig. 4, it has a smaller effective pressure area than when it is in the position shown in Fig. 6. It will be apparent that when the valve is in the former position a higher fluid pressure will be required to counteract centrifugal force and the pressure of spring 80, than will be required when the valve is in the latter position. In consequence of this arrangement a fluid pressure which is sufficient to move the valve from the position shown in Fig. 4 to the position shown in Fig. 6 will be considerably greater than the fluid pressure required to maintain the valve in the latter position. From this it follows that once the pressure within the transmission having risen through an increase in load to a point which will effect a movement of the pilot valve radially inwards (to the left in the drawings), the pressure may thereafter fluctuate and fall materially below the value required to shift the valve against the action of centrifugal force and the spring without any possibility of the valve returning to the original position. The range of pressure variation between the pressure required to move the valve against the spring and that required to maintain the valve in the position to which it is shifted, is, of course, determined by the relationship between the area of the valve head 73 and that of the annular counter-balancing area 77'. Such a range of pressure variation is preferably provided as to insure the operation of the transmission in the intermediate speed until such time as the fluid pressure indicates a sufficient reduction in load to make certain that the prime mover is capable of propelling the load in direct drive. In the absence of a provision of a certain pressure range over which the operation of the transmission in intermediate speed is assured, experience has shown that the pilot valve will flutter and otherwise behave in an unreliable manner.

The function of the pilot valve is to determine the position of the main valve control piston 53. The position of this piston, as before fully set forth, is determined by the admission of fluid pressure to or venting of the control chamber 52. This function is accomplished by the pilot valve in the following manner:

When the pilot valve head 73 is in the position shown in Figs. 4 and 7, fluid pressure enters the hollow stem of the valve from channel 76 through ports 75 in the valve head, thence outward through ports 74 into the annular space surrounding the valve stem, which space at all times freely communicates with the control chamber 52 through a passage 82. When the conditions of engine speed and load torque are such as to move the valve to the position shown in Fig. 6, communication between the pressure channel 76 and the control chamber 52 is cut off, the valve head 73 being moved to a point where the ports 75 no longer register with the pressure channel. At the same time, ports 72 have been uncovered, thereby venting the pilot valve cylinder 70, and consequently, the connected control chamber 52 to the idle fluid space within the driving rotor. The control piston 53 being thus relieved from pressure on its left side, will be immediately moved by the now unbalanced fluid pressure on its opposite face to the position shown in Fig. 6. The duplicate main valve actuating device in the opposite end of bore 42 is similarly controlled by the common pilot valve M, the annular chamber 70' of which is always directly connected with the main valve control chamber 52' through conduit 78.

The operation of the automatic transmission ratio control is as follows:

Assuming that a motor vehicle equipped with the transmission is at rest, the driver desiring to start the vehicle gradually opens the engine throttle. Up to, let us say, 300 R. P. M., centrifugal force acting on the cross-head 55 is insufficient to compress the spring 59c, and consequently will occupy the position shown in Fig. 5, the main valve 40 occupying a corresponding position shown in Fig. 9 in which by-pass ports 43 are wide open, thus preventing any transmission of torque from the driving shaft to the driven shaft. At such times fluid is idly circulated from the pressure chambers of the delivery pump through ports 43 to the idle fluid space, where it is again fed into the pump. As the speed of the engine increases above 300 R. P. M., centrifugal force gradually overcomes the thrust of spring 59c, thereby effecting a gradual throttling of the by-pass ports 43 and a consequent building up of pressure in the delivery pump, which pressure results in the delivery of torque to the driven element of the transmission. For a certain interval transmission is had through a hydraulic slipping clutch effect. As the by-pass or vent ports 43 are closed with a consequent building up of fluid pressure, more and more of the fluid is compelled to pass into the channels 26 leading to the receiving pump or motor J, and when the ports 43 are entirely closed, as shown in Fig. 8, the delivery and receiving pumps constitute a completely closed circulating system, fluid passing from the delivery pump through channels 25 to the main valve chambers, thence through channels 26 to the receiving pump and returning through the idle fluid space surrounding the pumps to the intake chambers of the delivery pump. This represents the positive intermediate speed drive in which, due to improvements hereinbefore described, the mechanical efficiency of the transmission is very high. The slipping clutch action is no longer present, and consequently practically all the energy in the fluid stream is conserved.

The transition from free engine to intermediate speed, and also from intermediate speed to direct drive, can never occur at a rate which would result in undue stress on any part of the transmission because of the dash pot action which occurs between the cross-head 55 and the diaphragm 50, the bores 58 through the cross-head being practically closed by the spring-pressed valve disk 59. Fluid trapped between the said diaphragm and cross-head will be permitted to escape only at such a rate as will insure a gradual outward movement of the head and consequent application of the hydraulic clutch, the same being true of a further movement from the position corresponding to intermediate speed to that of direct drive.

When the torque demand for accelerating the vehicle decreases to a point where the resultant fluid pressure within the transmission is no longer sufficient to maintain the pilot valve in the position shown in Fig. 6 against the action of centrifugal force and the pressure of spring 80, the pilot valve will shift radially outward to the position shown in Figs. 4 and 7. In this position fluid under pressure is admitted to the control chamber 52, and fluid pressure on opposite sides of control piston 53 being now equalized, the piston and also cross-head 55 will be thrown outward by centrifugal force, resulting in a movement of the main valve through the connecting rods and actuating disk 45', to the position shown in Fig. 4. This position represents direct drive, the main valve 40 now cutting off all flow of fluid from the pressure channel 25 of the delivery pump, the driving and driven parts now rotating at the same speed.

The automatic shifting of the transmission from direct drive to free engine occurs simply in the reverse order to the above. If the fluid pressure rise, due to, let us say, the vehicle encountering a grade, a point will be reached where such pressure acting on the reduced effective pressure area of pilot valve 73 will overcome the action of centrifugal force and spring 80, causing the pilot valve to shift to the position in which the control chamber 52 is vented through ports 82, 74 and 72 to the idle fluid chamber. The unbalanced fluid pressure then acting on the outer face of control piston 53 forces the piston and cross-head 55 inwards to the position shown in Fig. 6, resulting in setting the main valve 40 in the position corresponding to intermediate speed, as indicated in Fig. 8. Should the load be so great that in spite of the increase in torque derived through cutting the transmission ratio from direct drive to, let us say, a 2 to 1 ratio at intermediate speed, the engine will be overloaded and slow down to a speed below 300 R. P. M., the force of spring 59c will begin to exceed the action of centrifugal force on the cross-head and associated parts, so that further decrease in engine speed will result in gradual opening of by-pass ports 43, whereby the engine is gradually relieved of the load in such manner that it can never stall.

To the left in Fig. 4 a pressure relief valve O is shown, the chamber 85 of which is in communication with the fluid pressure side of the transmission through port 86 leading to the bore 42, within which the cross-head 55 is situated, such bore, as before pointed out, being at all times subject to the fluid pressure obtaining within the delivery pump. A small bore 87 connecting with port 86 provides access of fluid pressure to the valve chamber 85 when the cross-head 55 covers up the port 86 on the pressure side. The valve member 88 is of the mushroom type seating against a tapered seat 89 at the inner end of the valve cylinder 90. The valve stem 91 projects through a fixed guide 92 and has fastened at its outward end a spring retaining cap 93. Between the cap 93 and guide 92 a strong coil spring 94 is situated. This spring is designed to have sufficient thrust to maintain the relief or safety valve 88 in the closed position under all but extreme pressures which may be developed within the transmission. The valve, when opened, permits fluid pressure developed in the transmission to escape into the idle fluid space 31 which completely surrounds both the pumps and the automatic control mechanism therefor. The use of such a relief valve is not at all essential as the transmission can readily be designed to withstand any stress that may be placed upon it by the engine, but under certain circumstances it may relieve the moving parts from shock, and it does also provide a mass symmetrically disposed with respect to the pilot valve whereby the two are substantially dynamically balanced when the transmission is in rotation.

Suction relief valves N may also be provided to permit fluid to freely enter the chambers of the delivery pump should the pressure in the idle fluid side of the transmission at any time exceed the pressure within the delivery pump. If the driven element of the delivery pump tends to rotate faster than the driving element, as will occur when an automobile is coasting down hill, a considerable suction will be thereby developed in the pressure chambers of the pump, and if free access of fluid to such chambers is not provided by a suction relief valve, cavitation will occur which is attended by unpleasant sounds due to the liquid rushing into the pump chambers past the vanes and at any points where there is the slightly clearance between working parts. According to the present invention, relative motion between the driving and driven parts of the pump when the latter tends to rotate faster than the former, is prevented by a ratchet device which will hereinafter be described, but should it be desired to render the ratchet device inoperative so that the car would be free to rotate at speeds in excess of engine speed and independently of the engine, the relief valve N will be desirable. Two of these valves are shown, one at the outer end of each of the bores in which the two main valves 40 operate. The type of valve employed comprises a disk 95, having a stem 96 projecting through a guide 97 which is supported in the center of the valve opening on a spider 98. The spider is formed integrally with a member 99, which is screwed into the main driving rotor casting, the said member being formed to provide a seat for the valve disk. Between the guide 97 and the outer end of the valve stem projecting therethrough, a light spring 100 is interposed, whereby fluid will always be permitted to enter the pressure chambers of the delivery pump whenever the external pressure exceeds that within said chambers.

One of the improvements, according to the present invention, is the provision of a ratchet device between the driving and driven elements whereby the two shafts will be mechanically locked together when the driven shaft tends to rotate ahead of the driving shaft, which will occur when a motor vehicle is coasting down a grade. Such locking of the shafts together affords the full advantage of "braking on the engine" ordinarily present in mechanical transmissions. The preferred form of ratchet is shown in Fig. 14 and in its relation to the other parts of the transmission in Fig. 1. The construction follows conventional practice in the design of the well-known roller ratchet. The annular housing 105 is rigidly connected to the driving housing 1, which is propelled by the engine. Within such housing a hardened steel race 106 is provided, said race being rigidly mounted on the driven shaft 4. Within the annular housing 105 pockets are formed having inclined surfaces 107. Within such pockets ratchet rollers 108 are adapted to be shifted bodily, clockwise or counter-clockwise, in accordance with the relative motion between the driving and driven parts. If the inner race 106 connected to the driven shaft tends to rotate clockwise with respect to the housing 105, the rollers will be moved in the pockets to the shallow end where they jam between the inclines 107 and the race, providing thereby a positive mechanical connection between the two parts. A relative rotation in the opposite direction will, however, release the rollers by moving them to the deep end of the pockets where sufficient clearance between the housing 105 and the race 106 is provided to permit perfectly free relative motion between the parts. The arrow in Fig. 14 indicates the direction of motion of the engine and driving rotor, consequently, if the driven shaft tends to rotate in the direction of the engine and at a greater speed, it will cause the rollers to lock in the manner above described.

According to the present invention a special oil supply system is provided which is adapted to maintain an adequate supply of fluid in the hydraulic transmission and also to replenish the oil in the crank case of the engine which drives the transmission. As is well understood, an engine, particularly of the internal combustion type, continuously consumes a considerable quantity of oil, which works up past the pistons and is ejected with other exhaust products from the cylinders. The consumption of oil in the engine may be continuously made up for by permitting a leakage to occur from the hydraulic transmission to the engine crank case or sump. Heretofore the problem of packing the shafts which project through the hydraulic transmission housing to avoid all leakage, has presented certain difficulties. This problem is now entirely eliminated because a considerable leakage at such points is now desirable. There is now only required some suitable means surrounding the moving parts at points where leakage will occur, such means being adapted to catch the oil as it is thrown from the rotating parts and convey it to the engine. In Figure 1 two such means are illustrated, one being the stationary casing 110 surrounding the hydraulic transmission, which casing preferably forms a unitary structure with the engine crank case, one end of which is indicated at 111. The other leak collecting means comprises a receptacle 112 surrounding the projection of the driven shaft 4 outward from the casing 110. This receptacle is preferably rigidly secured to the stationary casing 110, as shown, and is provided with a drain 113 which connects the receptacle with the interior of the said casing. At the lower left corner of the casing a port 114 provides a communication between the engine crank case or sump and the casing, the partition 111 in which the port is located representing the end of the engine crank case.

In the embodiment illustrated in Figure 1, two packing devices are employed, both being of the floating diaphragm type. One of these devices, 115, restricts the leakage of fluid between the driving rotor 1 and the stationary casing 110, within which the rotor is mounted. The other packing device 116 restricts the leakage between the stationary casing projection 117 and the driven shaft 4. The packing devices 115 and 116 form the subject-matter of my co-pending United States application Serial No. 688,247, filed January 24, 1924, and need not be here particularly described because of the disclosure there contained and the fact that practically any known packing device is adaptable to the requirements of the present construction, the joint not being required to effectively prevent leakage. It will be noted that no packing joint of any kind is required at the left side of the transmission because of there being at that end no shaft opening in the driving rotor.

The lubricating oil commonly employed for automobile engines is also quite suitable as a fluid medium in the hydraulic transmission. For this reason a common reservoir G may be provided, situated preferably at an elevation above the hydraulic transmission, the same being conveniently mounted behind the vehicle dashboard. The reservoir G communicates through a pipe 118 with the interior of the driving rotor 1 through the roller ratchet device 6, thence through the roller bearing 119 and channel 121. The channel 121 leads directly to the idle fluid space within the driving rotor.

In filling the transmission, screw plug 123 is removed from the driving rotor, access being had to such plug through the large opening shown at the top of casing 110. Oil may now be introduced directly into the driving rotor through the opening thus provided or permitted to flow into the transmission from the reservoir G, the plug hole in the driving rotor providing a vent for air within the transmission whereby the rotor 1 may be completely filled with oil. If it is desired to drain the transmission, the driving rotor may be turned until plug 123 is at the bottom. The oil will then flow into casing 110, from which it may be removed by opening plug 124. A valve 125 is situated in the pipe 118 between the transmission and the fluid reservoir, whereby the quantity of oil flowing to the transmission and thence to the engine may be regulated or shut off entirely. In Fig. 12 the relationship of the fluid reservoir to the hydraulic transmission and engine is indicated diagrammatically. In the modified form of the invention shown in Fig. 11 a somewhat different arrangement of the leak trapping receptacle surrounding the moving parts is indicated at 130. The member 130 comprises a cylindrical sheet metal collector, the free edges of which are bent inwards, as shown, so that any fluid passing the packing device 131 and thrown outwards by centrifugal force will be carried to the drain 132 at the bottom of the receptacle, which drain communicates directly with the engine sump.

In my co-pending United States application Serial No. 85,291, I have described a combined hydraulic and mechanical transmission similar in principle to that illustrated in accompanying Fig. 11, as regards the mounting and arrangement of the mechanical change speed gear with respect to the hydraulic change speed gear. According to the present invention, the relationship between the hydraulic and mechanical parts of the change speed gear is quite different. The present arrangement is shown in Figs. 1 and 12, and comprises an auxiliary mechanical gear shift device C formed integrally with the normal differential housing D which ordinarily forms a part of the automobile rear axle assembly, the gear shift C being connected to the hydraulic transmission A through propeller shaft K, at either end of which suitable universal joints F, F' are provided. The preferred form of universal joint comprises one or more flexible disks 130 connected to the propeller shaft through spiders 131, the arms of which are clamped to the disks by bolts 132 at points spaced 120° apart and at a distance of preferably at least four inches from the axis of the shaft. The driven shaft 4 of the hydraulic transmission is conected to the flexible disks 130 of the universal joint F at three points midway between the three bolts 132, and at the same radial distance from the shaft center. The element which connects the shaft 4 with such disks, instead of being simply a spider similar to 131, comprises a brake drum 133 rigidly keyed to the said shaft. The drum is formed with bosses 134 which project beyond the drum face and are bored to receive bolts 135, which clamp the flexible disks together and also rigidly secure them to the brake drum at points 120° apart, such points, as before set forth, being situated preferably midway between the points at which the disks are fastened to spider 131. By this construction a special mounting for the universal disks on shaft 4 is eliminated, the brake device serving instead as such mounting.

The mechanical gear shift in combination with a hydraulic change speed gear, is itself peculiarly adapted, according to the present invention, to be combined with the differential housing D so that the two form a unitary structure. The chief reason for this is that the mechanical gearing is only used for emergency purposes or normal operation in reverse gear, both of which uses represent only a very small part of the actual operating life of the vehicle. For this reason the gears may be made small and relatively light as compared with ordinary mechanical transmissions. This fact permits the combination of the mechanical speed reducing gear with the differential gear, where heretofore such combination has not been considered good practice because of the comparatively large increase in unsprung weight. The weight of the mechanical transmission is also materially reduced when combined with a hydraulic transmission, because of the fact that the number of changes of speed will be reduced in exact proportion to the number of speed ratios provided by the hydraulic transmission, that is to say, if the hydraulic transmission has a direct drive and one speed reduction, and the mechanical transmission has a direct drive and one speed reduction, the combination provides four possible transmission ratios with only two speeds in the mechanical transmission.

In Figure 1 the mechanical change speed gear C incorporates three forward speeds and one reverse. This arrangement is merely illustrative of a transimssion which, under conceivable conditions, might require six different transmission ratios (it being remembered that the hydraulic transmission A provides two transmission ratios). In practice, it has been found that a mechanical transmission having only a direct drive and one speed reduction in combination with the hydraulic transmission shown, has ample flexibility to meet any requirement of practical transportation.

The mechanical transmission shown comprises a housing 140, which preferably is formed as an integral part of the differential housing 141. Within the transmission housing a short power shaft 142 is centrally mounted carrying on its inner end a gear 143. Said gear meshes with gear 144 at all times driving the jack-shaft 145. To the right, gear 143 is provided with teeth 146 which constitute the direct drive. The driven shaft 147 is mounted in suitable bearings, co-axially with power shaft 142, and carries within the transmission housing two gears 148 and 149 which are slidably splined to said shaft. The end of the shaft projecting into the differential housing carries the usual beveled pinion, 150, which meshes with ring gear 150' of the differential. Gear 148 is adapted, when shifted to the right by shifting fork 151, to mesh with a gear 152 on the jack shaft, thereby providing the higher intermediate speed drive.

Gear 148 may also be shifted into the neutral position shown in Figure 1. This gear is futhermore recessed and so formed as to provide a positive connection with the direct-drive teeth on gear 143 when shifted to the left, so that the direct-drive teeth 146 engage similar teeth internally formed on the recessed portion of gear 148. If the lower intermediate speed is required, gear 148 is left in the neutral position and gear 149 is shifted by its fork 153 to the left to engage a smaller gear 154, and when reverse drive is required, gear 149 is shifted into engagement with an idler gear, which permanently meshes with gear 155 on the jack shaft. The idler gear (not shown) follows conventional reverse gear practice in automobile transmissions. The shifting forks 151 and 153 which determine the position of the two movable gears on the driven shaft 147 may be controlled by the operator of the vehicle in any suitable manner, the various connections between the forks and a gear shift lever being too well known to require detailed explanation. As compared with the conventional mechanical transmission, which has heretofore been incorporated as a part of the rear axle assembly, such transmission being required to perform the whole speed changing duty for the vehicle, the present auxiliary, or, as it may be termed, emergency mechanical transmission, need weigh not more than one-third as much. In consequence, the increase in unsprung weight (the transmission being hung directly on the rear axle, as between which and the wheels there is no resiliency except that of the tires) in the present device, is relatively unimportant, whereas, with constructions contemplated heretofore, it has presented serious difficulties.

On the other hand, material advantages are to be gained by separating the mechanical part of the transmission from the hydraulic part of the transmission. The accessibility of the various parts is increased and the cost of manufacturing the combined mechanical and hydraulic transmission materially reduced. As hereinbefore fully set forth, the hydraulic transmission A preferably forms a unitary structure with the engine crank case. By this expression it is not intended to indicate that the transmission housing need be formed with the engine crank case as a single piece of metal, but merely that they may be assembled in such manner as to constitute what is known in the art as a unit construction. The same principle characterizes the combination of the emergency mechanical gear with the differential. The hydraulic transmission casing 110 comprises preferably a rigid casting, the structural requirements being substantially the same as those of the engine crank case. On the other hand, the housing 140 for the mechanical change speed gear is small as compared with the hydraulic transmission housing and of practically the same size as the differential housing. For this reason the two may be cast or drop forged together with good economy, although the housings may be formed separately and bolted together to form a unitary structure. Separating the hydraulic and mechanical part of the transmission desirably reduces the overall length of the engine unit, which otherwise would require greater strength because of its excessive length.

The modified form of transmission shown in Fig. 11 is provided with the same fluid pumps and automatic control means therefor as the device shown in Figure 1. The mechanical transmission is, however, directly connected to the hydraulic device forming a unit construction therewith. The mechanical gearing includes a direct drive through the meshing of internal and external gears 160 and 161, intermediate speed through the meshing of driven gear 162 with jack-shaft gear 163, and reverse drive through the meshing of driven gear 164 with a reverse pinion (not shown) which is in constant mesh with jack shaft gear 165. The transmission is illustrated in neutral position, the other portions of the transmission do not require explanation as they are substantially like the corresponding parts of the preferred embodiment of the transmission shown in Figure 1.

Between the hydraulic transmission and the mechanical change speed gear, a hydraulic braking device L is provided. Details of this device are shown in transverse section in Fig. 13. The brake pump comprises a rotor 167 rigidly mounted upon the driven shaft 4, and a surrounding stationary housing 168. Within the rotor sliding vanes 169 are mounted, and in the stationary housing rotary abutments 170 are provided. These abutments may be variably adjusted to provide in one position a perfectly free communication between the pressure chambers 171 and suction chambers 172 of the pump, in another position to completely cut off such communication, and in positions intermediate the two extremes, variably throttle the flow of fluid. The construction and operation of such rotary abutments is fully set forth in my co-pending United States application Serial No. 85,291. It will be understood that the abutments may be adjusted by any suitable manually operable means. Regardless of the position of the abutments, a communication is at all times provided between the pressure and suction chambers of the pump through a cooling coil 173, the turns of which surround the stationary pump casing. When the abutments are set in a position which completely separates the pressure and suction chambers of the pump, fluid will be forced from the pressure chambers outward through ports 174 into the annular pressure channel 175, in which it will be conveyed to the end of the cooling coil which enters the pressure channel at 176. The fluid, after passing through the coil, is returned to the suction channel 177 in the pump housing, and from such channel through ports 177' to the suction chambers of the pump. The resistance to the flow of oil through the cooling system may be regulated by a valve 180. According to the above-described construction, when it is desired to reduce the speed of the vehicle, abutments 170 are rotated to, let us say, a position corresponding to Fig. 13, in which the direct flow of fluid between the pressure and suction chambers of the pump has been materially restricted but not entirely cut off. This will give rise to a fluid pressure as the internal pump member 167 is rotated by the driven shaft. This fluid pressure will cause part of the oil to be circulated through the cooling coil 173, the rate of circulation being dependent upon the throttling due to the adjustment of abutments 170, and which throttling determines the braking effort of the brake. Consequently, the cooling effect will be proportional to the heat generated in the brake. When the abutments are wide open no fluid will be circulated through the cooling coil, but will, instead, pass freely from the pressure to the suction chambers without leaving the pump chambers, and will consequently offer practically zero resistance to the free rotation of the driven shaft.

The hydraulic brake may be supplied from the common fluid reservoir G, fluid therefrom passing through a conduit directly to the suction channel 177 of the brake pump, and thence to the hydraulic transmission proper through a duct 181 and annular space 182, which communicates with the roller bearings of the transmission.

In certain of the claims appended hereto the cooperating delivery and receiving pumps, together with their connecting passages, are described as a "pumping system" and the portions of the system in which fluid pressure is developed by the pumping action is referred to as the "pressure side" of the system, while the remaining portion, in which the fluid is not under pumping pressure, is described as the "idle fluid side" of the system.

While the preferred embodiment of the invention has been hereinbefore described and illustrated, and also one modification thereof, it is to be understood that the invention is not limited thereto but may be otherwise variously modified and embodied without departing from the spirit of the invention, as set forth in the following claims.

What I claim is:

1. A hydraulic power transmission including co-operating delivery and receiving pumps, and a sliding valve connected between said pumps, said valve having three operating positions, the first position cutting off communication between the two pumps, the second position establishing communication between the said pumps, and the third position connecting the pressure chambers of the pumps to the idle fluid side of the pumping system, whereby in the latter position of said valve the movement of the pumps results in the idle circulation of fluid.

2. A hydraulic power transmission according to claim 1, further characterized in that said valve is mounted in a rotary part of the transmission and is adapted to slide in a substantially radial direction.

3. A hydraulic power transmission including co-operating pumps, a valve adapted to control said pumps to vary the speed ratio of the transmission, and automatic valve actuating means, sensitive to the combined action of centrifugal force and fluid pressure above a predetermined number of R. P. M., and sensitive to centrifugal force but not to fluid pressure below said number of R. P. M.

4. A power transmission device including adjustable means adapted to effect a direct drive, an intermediate speed drive and a slipping clutch drive, automatic transmission ratio control means adapted under the simultaneous and opposed influence of engine speed and load torque to automatically adjust said adjustable means whereby to select under varying conditions of engine speed and load torque the appropriate drive as between direct drive and intermediate speed, and further adapted, below a predetermined number of R. P. M., to regulate the clutch slip solely in accordance with engine speed.

5. A hydraulic power transmission including co-operating delivery and receiving pumps, a main valve interposed between said pumps, said main valve having a plurality of control positions, one corresponding to direct drive, another to intermediate speed, and a third position to slipping clutch and free engine, pressure-sensitive means adapted to move the valve between the positions corresponding to direct drive and intermediate speed, and speed-sensitive means adapted to move the valve between the last-mentioned position and the position corresponding to slipping clutch and free engine.

6. A hydraulic power transmission including co-operating pumps, a main valve adapted in one position to establish, and in another position to cut off, communication between the pressure chambers of said pumps, an automatic pilot valve adapted to hydraulically control the position of the main valve between the two positions, set forth, and a centrifugally-governed means adapted to move the said main valve to a third position independently of the pilot valve, in which third position the pressure chamber of at least one of the pumps is vented to the idle fluid side of the pumping system.

7. A hydraulic power transmission including a delivery pump and a receiving pump, valve means communicating with said pumps valve-regulating means sensitive to the simultaneous and opposed action of engine speed and load torque, and valve-regulating means sensitive solely to engine speed, said first-mentioned regulating means being adapted to adjust said valve means whereby to establish and cut off communication between the pressure chambers of the two pumps, and said latter regulating means being adapted to adjust said valve means whereby to vent the pressure chamber of the delivery pump to the idle fluid side of the pumping system.

8. A hydraulic power transmission including a delivery pump and a receiving pump, valve-regulating means sensitive to the simultaneous and opposed action of centrifugal force and fluid pressure, and valve regulating means sensitive solely to centrifugal force, said first-mentioned means being adapted to control the circulation of fluid between the two pumps, and said latter means being adapted to establish or cut off communication between the pressure chambers of the said pumps and the idle fluid side of the pumping system.

9. In a power transmission device, the combination of a driving part, a driven part, hydraulic change speed means connecting said driving and driven parts, and automatic mechanical coupling means adapted to positively connect the said parts together when the driven part tends to rotate faster than the driving part, and to disconnect said parts when the driving part rotates faster than the driven part.

10. In a power transmission device, the combination of a driving part, a driven part, hydraulic change speed means connecting said driving and driven parts, and ratchet means interposed between said parts adapted to permit the driven part to rotate slower than the driving part and to prevent said driven part from rotating in the direction of the driving part at a speed in excess of that of the driving part.

11. A hydraulic power transmission including a delivery pump of the rotary vane type, at least one abutment in said pump, said abutment having a curved face concave with respect to the movement of fluid from the pressure chamber of the pump, said curved face being disposed so as to deflect the fluid transversely with respect to the plane of rotation of the pump.

12. A hydraulic power transmission including a delivery pump of the rotary vane type, at least one abutment in said pump, said abutment having two inclined faces, one face being adapted to eject fluid transversely from the pressure chamber of the pump, the other face being adapted to permit the radial induction of fluid into the suction chambers of the pump smoothly and without turbulence.

13. A hydraulic power transmission including a delivery pump of the rotary vane type, at least one abutment in said pump, said abutment having an inclined face so disposed as to eject fluid in a direction substantially parallel to the axis of rotation of the pump.

14. A hydraulic power transmission including a rotary vane receiving pump, at least one abutment in said pump, said abutment having an inclined face adapted to deflect the fluid stream which enters the pump in a substantially axial direction, so that the subsequent movement of the fluid due to said deflection will be substantially parallel to the walls of the chamber.

15. A hydraulic power transmission including a rotary vane receiving pump, at least one abutment in said pump, said abutment having two inclined faces, one of said faces being adapted to smoothly deflect fluid entering the working chamber of the pump transversely so that after deflection the flow within the chamber is substantially parallel to the walls thereof, the other inclined face of said abutment being adapted to smoothly eject the exhaust fluid radially from the pump chamber.

16. A hydraulic power transmission device of the differential pumping type, said device including a rotary vane delivery pump, a rotary vane receiving pump, a rotor comprising rotary elements of both said pumps, a valve chamber in said rotor and between said pumps, a curved deflecting surface commencing at the wall of the delivery pump pressure chamber remote from the receiving pump, and terminating near said valve chamber; and a curved deflecting surface commencing near the valve chamber and terminating at the wall of the receiving pump chamber remote from the delivery pump.

17. A hydraulic power transmission device according to claim 16, further characterized in that the said two curved surfaces form mutually reversed curves viewed from the axis of the common rotor.

18. A hydraulic power transmission device according to claim 16, further characterized in that the said curved deflecting surfaces each comprise the face of a pump abutment and a wall of a fluid channel contiguous to such abutment, the fluid channels providing fluid pressure communication between the delivery pump and receiving pump through the said valve chamber.

19. A hydraulic power transmission including a delivery pump, a receiving pump, a rotor comprising rotary elements of both said pumps, a piston valve in said rotor between said pumps and independent channels controlled by said valve and communicating one with the delivery pump and one with the receiving pump, each of said channels embracing the valve chamber circumferentially.

20. A hydraulic power transmission, according to claim 19, further characterized in that the said valve is adapted to move radially.

21. A hydraulic power transmission device including a delivery pump, a receiving pump, a rotary comprising rotary elements of said pumps, an S shaped passage in said rotor connecting the pressure chambers of said pumps in such manner that fluid leaves the chamber of the delivery pump and enters the chamber of the receiving pump in substantially the same direction.

22. A hydraulic power transmission including a rotary vane delivery pump, a rotary vane receiving pump, a cast metal rotor forming the external elements of each of said pumps, and a fluid-tight sheet metal shell surrounding said rotor and fastened thereto, said shell forming with the rotor an annular idle fluid retaining chamber extending between the delivery and receiving pumps and through the relatively large cross-section of which the fluid can freely move from one pump to the other.

23. A hydraulic power transmission device including a main valve actuating piston, a cylinder closed at both ends and in which said piston slides, a piston rod projecting through one end of said closed cylinder, a pressure relief bore extending longitudinally through said piston and piston rod to effect a communication between the exposed end of the rod and the space within and at the opposite end of the cylinder, and a pilot valve adapted in one position to place the space surrounding the piston rod within the said cylinder, alternately in communication with the pressure or idle fluid side of the pumping system.

24. A hydraulic power transmission device including a main valve controlling the flow of liquid through the pumps, hydraulic main valve actuating means, an automatic pilot valve of the piston type adapted to control said actuating means, the said pilot valve being adapted in the control position corresponding to direct drive to be exposed to fluid pressure on opposite sides, and in the control position corresponding to an intermediate speed, to be exposed to fluid pressure on one side only.

25. A hydraulic power transmission device including a main valve, a pilot valve adapted to hydraulically control said main valve, said pilot valve having pressure-sensitive areas adapted to urge the pilot valve in opposite directions, and a port controlled by the position of the pilot valve adapted in one position to cut off pressure from certain of said areas, and in another position to apply pressure thereto, whereby the valve in one position will be subject to a greater resultant force than in said other position.

26. A hydraulic power transmission device including a main valve, a pilot valve adapted to hydraulically control said main valve, said pilot valve having a main pressure-sensitive area and a counterbalancing pressure-sensitive area, and means controlled by the position of said pilot valve adapted either to expose said counterbalancing area to fluid pressure or to relieve such area from pressure.

In witness whereof, I have hereunto signed my name.

SVEN GUSTAF WINGQUIST.